Figure 1:
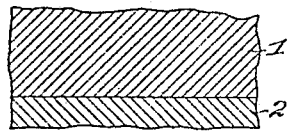

No. 682,914. Patented Sept. 17, 1901.
G. D. COLEMAN.
ANTIFOULING COATING.
(Application filed Dec. 31, 1900.)

(No Model.)

Witnesses:
John F. C. Prinkloh
Horace Van Everen

Inventor:
George D. Coleman
by his Attorney
Benjamin Phillips

UNITED STATES PATENT OFFICE.

GEORGE D. COLEMAN, OF BOSTON, MASSACHUSETTS.

ANTIFOULING COATING.

SPECIFICATION forming part of Letters Patent No. 682,914, dated September 17, 1901.

Application filed December 31, 1900. Serial No. 41,657. (No model.)

To all whom it may concern:

Be it known that I, GEORGE D. COLEMAN, a citizen of the United States, residing at Boston, in the county of Suffolk and State of Massachusetts, have invented certain new and useful Improvements in an Antifouling Coating for Metal Structures; and I do hereby declare the following to be a full, clear, and exact description of the invention, such as will enable others skilled in the art to which it appertains to make and use the same.

The present invention relates to an improved antifouling coating for metal structures intended to be submerged in or exposed to the action of water, and more particularly sea-water—such, for example, as the bottoms of iron or steel vessels, iron or steel work on bridges, piers, docks, caissons, lighthouses, or other metal structures the whole or parts of which are submerged in or exposed to the action of water.

The object of the present invention is to prevent the deterioration and corrosion of such metal structures and the accumulation of marine growths thereon.

In the patent granted to me July 25, 1899, No. 629,426, I described an antifouling coating for metal structures which is composed of a layer of paint applied to the surface of the metal to be protected, a layer of comminuted soft metal, such as lead, embedded in the layer of paint, and a layer of comminuted copper embedded in the layer of soft metal presenting a smooth surface closely studded with bare particles of copper. The coating when exposed to the action of moisture prevents corrosion of the structure, and the slow decomposition of the copper surface prevents the accumulation of marine growths thereon. The coating described in my said patent is expensive, the ingredient of soft metal making the cost of the coating very considerable.

In my companion application, filed of even date herewith, Serial No. 41,656, I have described and broadly claimed an antifouling coating for metal structures composed of a layer of paint, a layer of finely-divided insulating material, and a layer of copper, preferably driven against the layer of insulating material and secured thereto by a binding layer of paint. My said companion application specifically claims such an antifouling coating, in which the insulating material consists of a finely-divided mineral substance. I have found in some instances that it is desirable instead of using the layer of soft metal of my said patent or the layer of insulating mineral material, as described in my said application, to use finely-divided vegetable substance—such as lignum-vitæ sawdust, oak sawdust, shoddy or flax tow or similar substances, papier-mâché, compressed fiber, or manufactured insulating material, such as compositions composed of vegetable and mineral substances—and I therefore desire to claim in the present application the antifouling coating for metal structures in which the active ingredient is pulverized, granulated, or comminuted copper and which is separated from the iron or steel by a layer of vegetable insulating material or a substance of which a vegetable material is a constituent or component part. I have found that the antifouling coating in which such an insulating material is used is elastic and capable of withstanding blows without breaking, being tough and durable and not so brittle as the antifouling coating in which the layer of insulating material consists of finely-divided mineral substance. It is apparent to those skilled in the art that an antifouling coating should be adapted to the particular use to which it is to be put and that for some uses the coating in which the insulating material consists of mineral substance is better adapted, while for other uses the coating in which the layer of insulating material is vegetable substance is better adapted. Furthermore, the method of knitting together the layers of material is specifically different in the case where vegetable substance is employed from that in which mineral substance is employed, because ordinarily the particles of copper will have greater hardness than the particles of vegetable substance, and the latter will be penetrated by the former, so that according to the present invention the particles of copper will be driven into the particles of vegetable substance.

To the above end the present invention consists of the antifouling coating for metal structures, hereinafter described and claimed.

The accompanying drawings illustrate diagrammatically the preferred form of my improved antifouling coating and the successive steps of a method of making the same.

Figure 3:
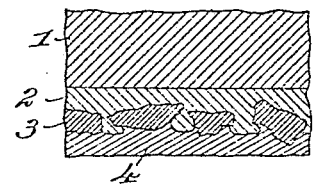
Figure 4:
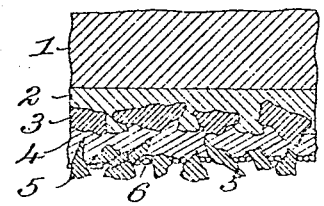
Figure 5:
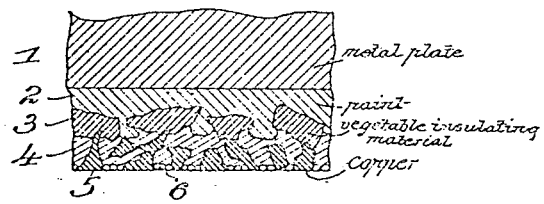

Figures 1, 2, 3, and 4 are enlarged diagrammatic sections illustrating the successive steps in the process of applying my improved antifouling coating, and Fig. 5 is a similar diagrammatic section illustrating the completed coating.

Figure 2:
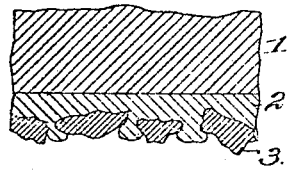

The metal 1 which is to receive the protecting-coating is first thoroughly cleansed as by scraping or washing before the antifouling coating is applied. I first apply to the metal a layer of suitable adhesive and preferably waterproof substance 2, herein called "paint." I prefer to make this paint of linseed-oil and varnish-gums in the proportion of forty gallons of linseed-oil to one hundred pounds of varnish-gums, and of the latter the best known to me are kauri and Zanzibar gums. This paint may be reduced for ease of application by means of a diluent, such as a turpentine or wood-alcohol, which is added until the paint is of such a consistency as to be readily laid upon the surface to be coated. It is not material to my invention that this particular paint should be employed in making my coating, as any suitable paint may be employed for this purpose. Fig. 1 illustrates the stage in the process of the application of my improved coating after the application to the metal to be covered of the layer of paint. This layer of paint is now preferably allowed to dry until it becomes tacky, and then I apply to the surface of paint granulated, comminuted, or fibrous insulating vegetable material 3. Any suitable vegetable insulating material may be used for this purpose. The insulating vegetable material is applied to the tacky layer of paint by any suitable means, such as a blower, and the particles of the material are projected into the surface of the layer of paint, as shown in Fig. 2. This layer of paint, with the layer of insulating vegetable material adhering thereto, is now allowed to become thoroughly dry, and then I apply a second layer of paint, as shown in Fig. 3, which is preferably the same kind of paint as that first applied to the metal, to which coating of paint is then applied by any suitable means, such as a blower, a layer of comminuted copper 5, which adheres to the second layer of paint 4. (See Fig. 4.) This layer of comminuted copper is now rolled, hammered, or pressed into the coating of paint and into the layer of insulating material 3, which layer will effectively prevent any of the comminuted copper from coming in contact with the metal to be coated, thus constituting an insulating medium between the metal to be coated and the comminuted copper and preventing to a greater or less extent electrolytic action between the two metals which would result in corroding the metal 1. It is to be noted in this connection that the rolling, hammering, or pressing of the comminuted copper through the layer of paint 4 results in driving the sharp corners or angles of the particles of copper into the particles of insulating vegetable material, by which means the particles of copper are afforded a tenacious hold upon the layer of insulating vegetable material, whereby they are securely supported by and attached to said layer and that the rolling, hammering, or pressing of the comminuted copper upon the layer of insulating material not only firmly unites such layer of copper to the layer of insulating material, but it also smooths the surface of the coating and turns the pieces of comminuted copper so that they will present comparatively smooth sides to the outer surface, where they will be exposed to the deteriorating action of moisture against them, whereby the salts of copper will be formed and the accumulation of marine growths thereon will be efficiently prevented.

In order to make the surface of the antifouling coating very full of the particles of copper, I prefer before rolling, hammering, or pressing the layer of comminuted copper into the paint 4 and layer of insulating vegetable material thereunder first to apply by any suitable means, as a blower, still more finely-divided comminuted copper 6, which will enter the interstices between the larger particles of comminuted copper previously applied, as shown in Fig. 4, and then the surface may be finished in the same manner as above described.

Having thus described my invention, I claim as new and desire to secure by Letters Patent of the United States of America—

1. An antifouling coating for metal structures composed of a layer of paint, a layer of finely-divided vegetable substance and a layer of comminuted copper, substantially as described.

2. An antifouling coating for metal structures composed of a layer of paint, a layer of finely-divided vegetable insulating material embedded in the layer of paint and a layer of comminuted copper driven in the layer of vegetable substance presenting a smooth surface closely studded with bare particles of copper, substantially as described.

In testimony whereof I affix my signature in presence of two witnesses.

GEORGE D. COLEMAN.

Witnesses:
HORACE VAN EVEREN,
ALFRED H. HILDRETH.